Dec. 8, 1959

C. L. MORSE 2,916,066

KEYHOLE SAW

Filed March 3, 1958

INVENTOR.
Charles L. Morse
BY
Barlow & Barlow
ATTORNEYS.

United States Patent Office 2,916,066
Patented Dec. 8, 1959

2,916,066

KEYHOLE SAW

Charles L. Morse, South Dartmouth, Mass.

Application March 3, 1958, Serial No. 718,869

2 Claims. (Cl. 145—31)

This invention relates to improvements in a keyhole saw and is a continuation in part of my application Serial No. 559,558, filed January 17, 1956, now abandoned.

It is usual in cutting a slot and the like with a keyhole saw to employ short, rapid strokes, and it often happens that the saw will be pulled out of the slot unnoticed by the user, and on the subsequent return stroke the end of the saw strikes solid wood, which frequently results in a badly bent saw blade.

An object of this invention is to provide a keyhole saw blade so constructed as to normally prevent the unintentional pulling of the saw from the slot during the sawing thereof.

A more specific object is to provide a keyhole saw with a stop means adapted to engage the rear edge of the saw cut so as to prevent the unintentional pulling of the saw out of the saw cut during the use of the saw.

With these and other objects in view, the invention consists of certain novel features of construction as will be more fully described and particularly pointed out in the appended claims.

In carrying out the invention, I provide at the free end portion of a saw blade a stop means which will be adapted in the use of the saw to engage the rear edge of the saw cut on the pull stroke of the saw. This means may take any of various forms, as for example, a non-cutting tooth which may be made of a length to project further than the cutting teeth of the saw. In other instances, I may provide a longitudinal recess extending inwardly from the cutting edge of the blade so as to provide a non-cutting tooth to engage the rear edge of the saw cut on the pull stroke.

Between the saw teeth and the end-stop, there is a smooth edge which serves two purposes. The elimination of teeth strengthens the blade at this point. The smooth edge also helps the operator to rapidly increase the saw speed, or in other words to get a "flying start" into the material being cut.

Figure 1:
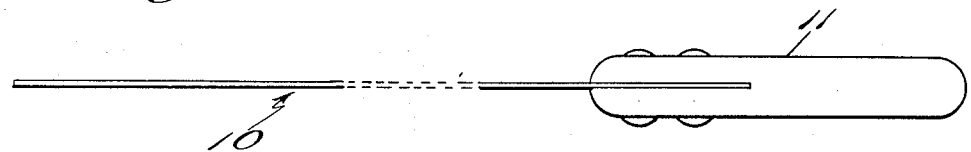
Figure 1 is a top edge view of a keyhole saw embodying my invention.
Figure 2:
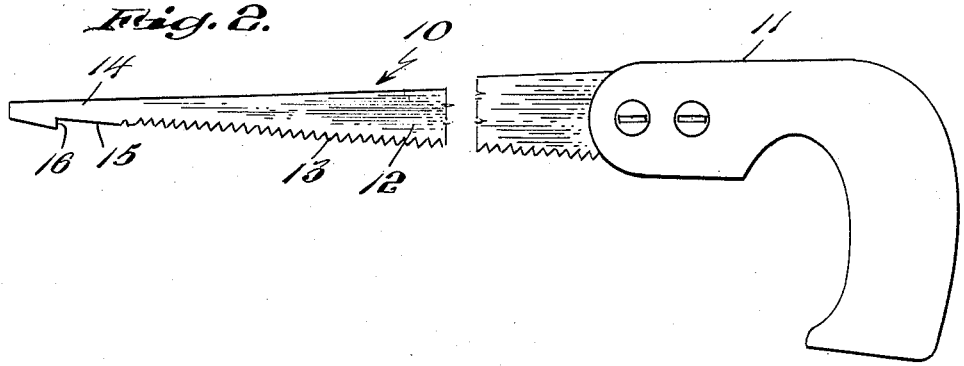
Figure 2 is a side elevation view of the saw.

Referring to Figures 1 and 2, I have shown the top and side views of a keyhole saw having the usual narrow blade 10, with edges which extend in a taper converging from the handle 11 toward the free end of the blade so as to provide a substantially pointed end. The blade is provided with a portion 12 having the usual cutting teeth 13, a portion 14 with a smooth edge 15, and a non-cutting tooth 16. The straight edge 15 extends in continuation of the lower edge of teeth 13; that is, teeth 13 and straight edge 15 project in a common straight line extending from the handle 11 to the non-cutting tooth 16. The tooth 16 projects outwardly from the smooth edge 15, and it provides a non-cutting stop which is adapted to engage the rear edge of the saw cut or kerf on the pull stroke of the saw.

Figure 3:
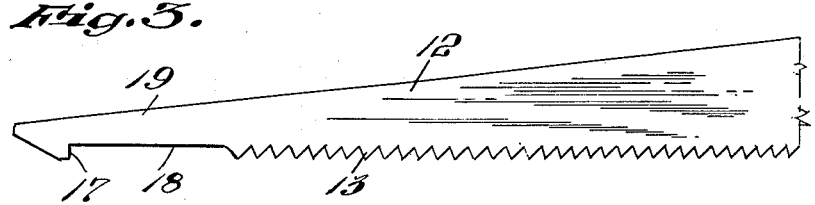
Figures 3 and 4 are similar views of modified constructions of the saw blade.

In Figure 3 I have shown a modified end portion 19 in which a smooth-edged recess 18 extends inwardly from the cutting edge and is made of substantially the same length and slightly deeper than the smooth edge 15 shown on Figure 2. The recess forms a non-cutting tooth 17 adapted to engage the rear edge of the kerf. In a sawing operation, sufficient pressure must be exerted so that the teeth will bite into the bottom of the kerf. This pressure is present even in a pull stroke, although to a lesser degree. Thus, if a long pull stroke be made sufficient to normally pull the teeth 13 out of the kerf, the pressure exerted on the blade will cause it to move toward the bottom of the kef and the bottom of recess 18 will engage the bottom of the kerf. Further movement of the blade will cause engagement of the non-cutting tooth 17 with the rear edge of the kerf and thus limit the pull stroke and the unintentional pulling of the saw out of the saw cut.

Figure 4:
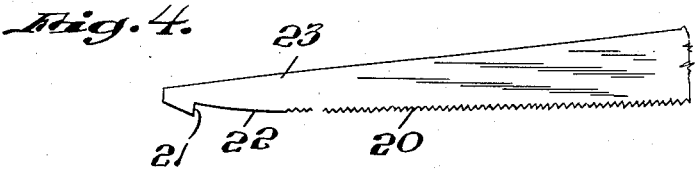

In Figure 4 I have again shown a modified end portion 23 with a smooth edge 22 and a non-cutting tooth 21. This adaptation is intended more for a saw with fine teeth 20 as are used in a metal-cutting or hack saw blade. The operation is as previously described.

From the foregoing description it will be readily apparent that I have shown several keyhole saw blades, each having a non-cutting tooth or stop which is adaptable to engage the rear edge of the saw cut on the pull stroke of the saw so as to prevent the unintentional disengagement of the saw from the saw cut or kerf.

I have shown and described my invention as being embodied in a keyhole saw in which such a limit stop is very desirable. It is contemplated, however, to embody the invention in the usual common wood or hack saw so as to provide for better control thereof, particularly in the use thereof by the unskilled, who frequently, in the use of the common saw, unintentionally pull the saw out of the kerf and, on the subsequent return stroke, strike the end of the blade against solid wood, which often results in a bent saw blade and perhaps injury to the user.

I claim:

1. A keyhole saw blade of generally tapering outline having a cutting edge, a handle end and a pointed end, a single non-cutting tooth having a non-cutting edge generally perpendicular to the longitudinal extent of the cutting edge of said blade, said tooth located adjacent the pointed end of the blade and presenting the non-cutting edge toward the handle end, said cutting edge having a group of cutting teeth and a smooth edge, said smooth edge located adjacent said tooth for a substantial distance toward said group of teeth, said group of teeth extending between said smooth edge and said handle end.

2. A saw blade as in claim 1 wherein the smooth edge is in continuation of a line with the tip ends of the cutting teeth.

References Cited in the file of this patent

UNITED STATES PATENTS

| 183,805 | Holden | Oct. 31, 1876 |
| 942,920 | Martin | Dec. 14, 1909 |
| 2,128,471 | Raines et al. | Aug. 30, 1938 |
| 2,780,256 | Dodd | Feb. 5, 1957 |

FOREIGN PATENTS

| 220,756 | Great Britain | Aug. 28, 1924 |